(12) United States Patent
Jacob et al.

(10) Patent No.: US 11,235,881 B2
(45) Date of Patent: Feb. 1, 2022

(54) HYBRID HEATER FOR AIRCRAFT WING ICE PROTECTION

(71) Applicant: Goodrich Corporation, Charlotte, NC (US)

(72) Inventors: Robin Jacob, Karnataka (IN); Guru Prasad Mahapatra, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 510 days.

(21) Appl. No.: 16/200,028

(22) Filed: Nov. 26, 2018

(65) Prior Publication Data

US 2020/0086999 A1  Mar. 19, 2020

(30) Foreign Application Priority Data

Sep. 13, 2018 (IN) .............................. 201811034572

(51) Int. Cl.
*B64D 15/12* (2006.01)
*H05B 3/14* (2006.01)
*H05B 3/18* (2006.01)
*H05B 3/26* (2006.01)

(52) U.S. Cl.
CPC ............ *B64D 15/12* (2013.01); *H05B 3/145* (2013.01); *H05B 3/18* (2013.01); *H05B 3/26* (2013.01); *H05B 2214/02* (2013.01); *H05B 2214/04* (2013.01)

(58) Field of Classification Search
CPC .......................... B64D 15/12; H05B 2214/02; H05B 2214/04; H05B 2203/02; H05B 1/0236; H05B 3/145; H05B 3/18; H05B 3/26; H05B 3/34
See application file for complete search history.

(56) References Cited

U.S. PATENT DOCUMENTS

| | | | |
|---|---|---|---|
| 4,458,137 A | 7/1984 | Kirkpatrick | |
| 7,546,980 B2 | 6/2009 | Giamati | |
| 9,210,739 B2 | 12/2015 | Chabach et al. | |
| 9,237,606 B2 | 1/2016 | Yue et al. | |
| 9,422,849 B2 | 8/2016 | Choi | |
| 9,511,871 B2 * | 12/2016 | Steinwandel | H05B 3/18 |
| 2011/0297665 A1 * | 12/2011 | Parker | H05B 3/22 219/494 |
| 2018/0124874 A1 | 5/2018 | Dardona et al. | |

FOREIGN PATENT DOCUMENTS

| | | |
|---|---|---|
| DE | 3717574 A1 | 12/1988 |
| EP | 3297395 A2 | 3/2018 |
| WO | 2012159608 A2 | 11/2012 |
| WO | 2014001414 A1 | 1/2014 |

OTHER PUBLICATIONS

European Search Report Application No. EP19196929; dated Feb. 4, 2020; pp. 7.

* cited by examiner

*Primary Examiner* — Shawntina T Fuqua
(74) *Attorney, Agent, or Firm* — Cantor Colburn LLP

(57) ABSTRACT

A hybrid heater system for aircraft wing ice protection is provided. The hybrid heater system includes a voltage source, a carbon nano-tube (CNT) heater, a first positive temperature coefficient (PTC) heater disposed in parallel with the CNT heater to form a parallel formation and a second PTC heater disposed in series between the voltage source and the parallel formation.

12 Claims, 2 Drawing Sheets

FIG. 1
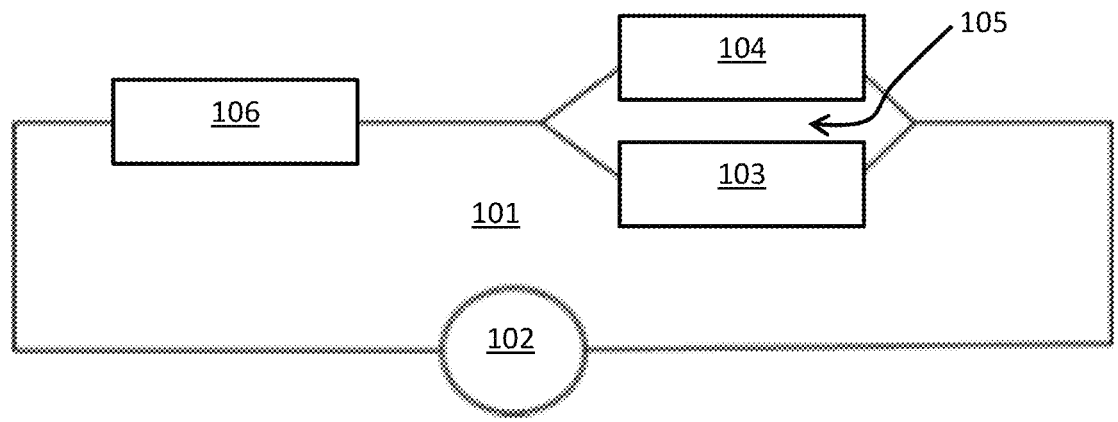
FIG. 2
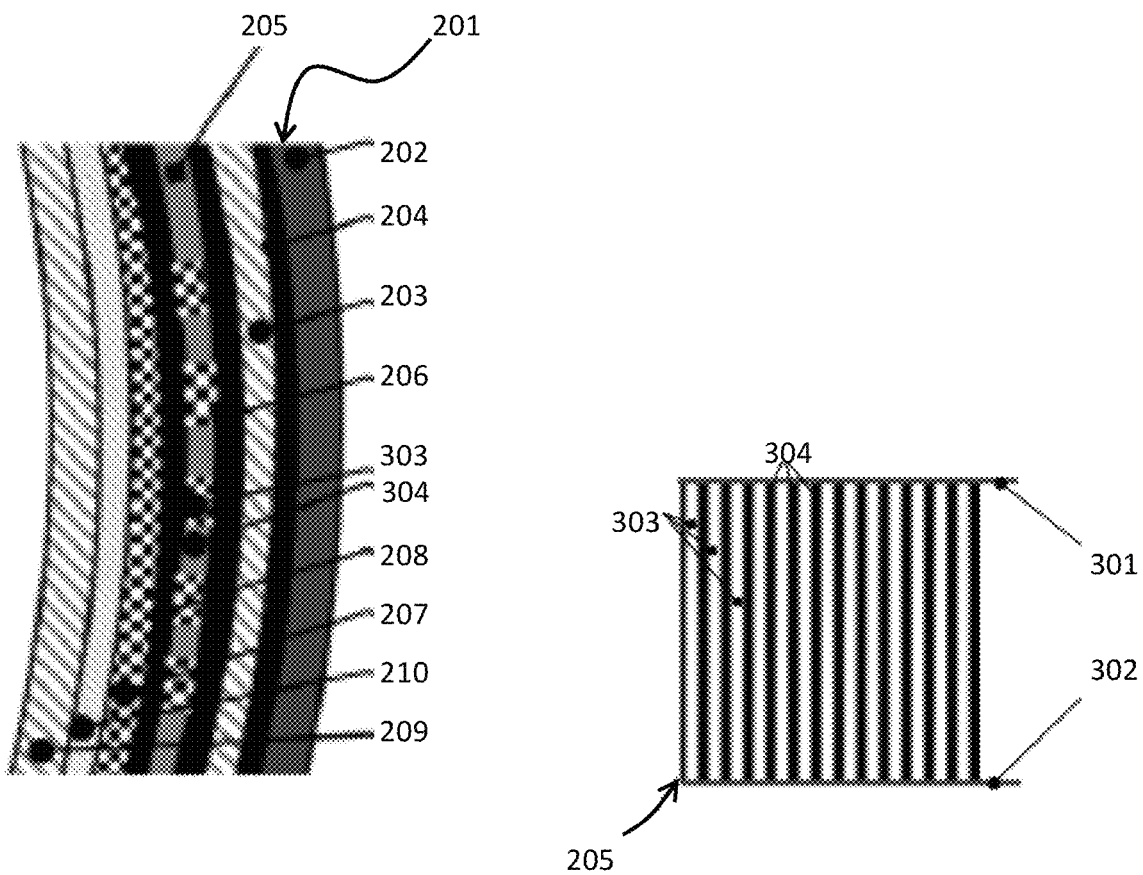
FIG. 3

HYBRID HEATER FOR AIRCRAFT WING ICE PROTECTION

CROSS-REFERENCE TO RELATED APPLICATIONS

This application claims the benefit of Indian Patent Application No. 201811034572 filed Sep. 13, 2018, which is incorporated herein by reference in its entirety.

BACKGROUND

The following description relates to aircraft wing ice protection and, more specifically, to a hybrid heater for aircraft wing ice protection.

Aircraft wing ice protection systems use various heater technologies for anti-icing or de-icing. Of these various heater technologies, one employs carbon nanotubes (CNTs) for electro-thermal heating. Where CNTs are employed in electro-thermal heating applications, it has been found that, at a certain volume percentage of CNTs in a CNT/silicone nanocomposite, a negative temperature coefficient (NTC) of the nanocomposite is mitigated and a resistance thereof stabilizes at higher temperatures.

BRIEF DESCRIPTION

According to an aspect of the disclosure, a hybrid heater system for aircraft wing ice protection is provided. The hybrid heater system includes a voltage source, a carbon nano-tube (CNT) heater, a first positive temperature coefficient (PTC) heater disposed in parallel with the CNT heater to form a parallel formation and a second PTC heater disposed in series between the voltage source and the parallel formation.

In accordance with additional or alternative embodiments, the second PTC heater establishes a maximum temperature capability for ice protection and the hybrid heater system operates with an absence of active temperature controls.

In accordance with additional or alternative embodiments, the first and second PTC heaters have differing and tailored electrical resistivity.

In accordance with additional or alternative embodiments, an effective electrical resistance of the parallel formation is less than an electrical resistance of each of the CNT heater and the first PTC heater.

In accordance with additional or alternative embodiments, the CNT heater and the first and second PTC heaters are layered in an aircraft wing.

In accordance with additional or alternative embodiments, the CNT heater and the first PTC heater occupy a same layer in the aircraft wing and the same layer occupied by the CNT heater and the first PTC heater includes a first terminal, a second terminal, first PTC heater elements extending between the first and second terminals and CNT heater elements interleaved between the first PTC heater elements and extending between the first and second terminals.

In accordance with additional or alternative embodiments, the aircraft wing includes an outermost wing surface, a first fiber glass prepreg layer underlying the outermost wing surface and a first film adhesive, a first heater layer underlying the first fiber glass prepreg layer and a second film adhesive, the first heater layer comprising CNT heater elements of the CNT heater and first PTC heater elements of the first PTC heater, a second heater layer underlying the first heater layer and a third film adhesive, the second heater layer comprising the second PTC heater and a second fiber glass prepreg layer underlying the second heater layer and a fourth film adhesive.

In accordance with additional or alternative embodiments, the CNT heater and the first PTC heater occupy different layers in the aircraft wing.

In accordance with additional or alternative embodiments, the aircraft wing includes an outermost wing surface, a first fiber glass prepreg layer underlying the outermost wing surface and a first film adhesive, a first heater layer underlying the first fiber glass prepreg layer and a second film adhesive, the first heater layer comprising the CNT heater, a second heater layer underlying the first heater layer and a third film adhesive, the second heater layer comprising one of the first or second PTC heaters, a third heater layer underlying the second heater layer and a fourth film adhesive, the third heater layer comprising the other of the first or second PTC heaters and a second fiber glass prepreg layer underlying the third heater layer and a fifth film adhesive.

According to an aspect of the disclosure, a hybrid heater system for ice protection of an aircraft wing is provided. The hybrid heater system includes a voltage source, a carbon nano-tube (CNT) heater comprising CNT heater elements and a first positive temperature coefficient (PTC) heater disposed in parallel with the CNT heater to form a parallel formation. The first PTC heater includes first PTC heater elements interleaved with the CNT heater elements in a first aircraft wing layer and a second PTC heater disposed in a second aircraft wing layer and in series between the voltage source and the parallel formation.

In accordance with additional or alternative embodiments, the second PTC heater establishes a maximum temperature capability for ice protection and the hybrid heater system operates with an absence of active temperature controls.

In accordance with additional or alternative embodiments, the first and second PTC heaters have differing tailorable electrical resistivity.

In accordance with additional or alternative embodiments, an effective electrical resistance of the parallel formation is less than an electrical resistance of each of the CNT heater and the first PTC heater.

In accordance with additional or alternative embodiments, the first aircraft wing layer includes first and second terminals between which the interleaved CNT and first PTC heater elements extend.

In accordance with additional or alternative embodiments, the second aircraft wing layer underlies the first aircraft wing layer.

According to an aspect of the disclosure, a hybrid heater system for ice protection of an aircraft wing is provided. The hybrid heater system includes a voltage source, a carbon nano-tube (CNT) heater in a first aircraft wing layer, a first positive temperature coefficient (PTC) heater disposed in one of a second or a third aircraft wing layer and in parallel with the CNT heater to form a parallel formation and a second PTC heater disposed in the other of the second or the third aircraft wing layer and in series between the voltage source and the parallel formation.

In accordance with additional or alternative embodiments, the second PTC heater establishes a maximum temperature capability for ice protection and the hybrid heater system operates with an absence of active temperature controls.

In accordance with additional or alternative embodiments, the first and second PTC heaters have differing tailorable electrical resistivity.

In accordance with additional or alternative embodiments, an effective electrical resistance of the parallel formation is less than an electrical resistance of each of the CNT heater and the first PTC heater.

In accordance with additional or alternative embodiments, the third aircraft wing layer underlies the second aircraft wing layer and the second aircraft wing layer underlies the first aircraft wing layer.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 1 is a schematic diagram of a circuit of a hybrid heater system in accordance with embodiments;

FIG. 2 is a layout of an aircraft wing structure in accordance with embodiments;

FIG. 3 is a schematic illustration of a layer of the aircraft wing structure of FIG. 2 in accordance with embodiments.

Figure 4:
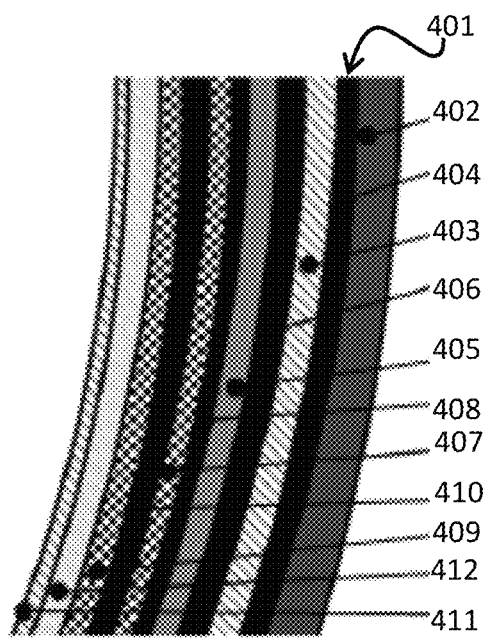
FIG. 4 is a layout of an aircraft wing structure in accordance with embodiments.

These and other advantages and features will become more apparent from the following description taken in conjunction with the drawings.

DETAILED DESCRIPTION

With the usefulness of CNTs understood, CNT heaters with variable resistance capabilities have been employed to obtain systems with decreased resistance and optimal heating at required locations. Meanwhile, systems that allow for quicker heating at lower temperatures while also avoiding overheating by a limitation of heater temperatures for enhanced heater life remain needed. While sensor-based feedback systems are available to prevent overheating, there are no current systems available that provide for current and power control based on temperature variations.

Thus, as will be described below, first and second positive temperature coefficient (PTC) heaters, which are based on a carbon black and polymer composite, are provided in an aircraft wing ice protection system in which the first PTC heater is connected in parallel with a CNT heater and the second PTC heater is connected in series with the parallel PTC and CNT heaters. This will allow for control of current to the heater assembly based on temperature variations. Electrical resistivity characteristics of the first and second PTC heaters (i.e., their respective carbon content percentages) could be tailored based on a required heating profile needed for anti-ice and deicing operations.

With reference to FIG. 1, a hybrid heater system 101 is provided for ice protection of an aircraft wing formed of multiple layers (see FIGS. 2 and 4). The hybrid heater system 101 includes a voltage source 102, a carbon nanotube (CNT) heater 103, a first positive temperature coefficient (PTC) heater 104, which is disposed in parallel with the CNT heater 103 to form a parallel formation 105, and a second PTC heater 106. The second PTC heater 106 is disposed in series between the voltage source 102 and the parallel formation 105.

The first and second PTC heaters 104 and 106 have different electrical resistivity characteristics and the electrical resistances of each of the first and second PTC heaters 104 and 106 can be tailored or customized according to desired or required temperature profiles. The effective resistance of the parallel formation of the CNT heater 103 and the first PTC heater 104 is less than both of their individual resistances and this ensures faster heating capability than otherwise possible where the CNT heater 103 is energized alone. The resistance of the second PTC heater 106 in particular can be tailored such that a total resistance of the circuit of the hybrid heater system 101 could be less than a resistance of the CNT heater 103 at relatively low temperatures and will increase to maximum at relatively high temperatures. Therefore, an initially lower resistance of the circuit of the hybrid heater system 101 can result in rapid heating and, at the relatively high temperatures, the resistance of the second PTC heater 106 increases to maximum to thereby restrict a power input to the circuit. Hence, a maximum heater temperature is restricted to prevent overheating and to save power. That is, the first and second PTC heaters 104 and 106 effectively perform a self-regulatory function to provide for uniform temperatures and to avoid hot or cold spots on an aircraft wing surface.

In other words, for the hybrid heater system 101 of FIG. 1 in which the first and second PTC heaters 104 and 106 have differing and tailored electrical resistivity, the second PTC heater 106 establishes a maximum temperature capability for ice protection and the hybrid heater system 101 operates with an absence of active temperature controls. In addition, an effective electrical resistance of the parallel formation 105 is less than an electrical resistance of each of the CNT heater 103 and the first PTC heater 104.

With reference to FIG. 2, an aircraft wing 201 is provided as a layered structure in which the CNT heater 103 and the first and second PTC heaters 104 and 106 are layered.

As shown in FIG. 2, the aircraft wing 201 includes an outermost wing surface 202, a first fiber glass prepreg layer 203 underlying the outermost wing surface 202 and a first film adhesive 204, a first heater layer 205 underlying the first fiber glass prepreg layer 203 and a second film adhesive 206, a second heater layer 207 underlying the first heater layer 205 and a third film adhesive 208 and a second fiber glass prepreg layer 209 underlying the second heater layer 207 and a fourth film adhesive 210.

With continued reference to FIG. 2 and with additional reference to FIG. 3, the first heater layer 205 includes a first terminal 301, a second terminal 302 opposite the first terminal 301, first PTC heater elements 303 of the first PTC heater 104 (see FIG. 1) and CNT heater elements 304 of the CNT heater 103 (see FIG. 1). The first PTC heater elements 303 extend longitudinally between the first and second terminals 301 and 302 and the CNT heater elements 304 are interleaved between the first PTC heater elements 303 and extend longitudinally between the first and second terminals 301 and 302.

Thus, in the embodiments of FIGS. 2 and 3, the first PTC heater elements 303 and the CNT heater elements 304 are provided in a same heater layer of the aircraft wing 201 and the second heater layer 207 includes the second PTC heater 106.

With reference to FIG. 4, an aircraft wing 401 is provided as a layered structure in which the CNT heater 103 and the first and second PTC heaters 104 and 106 are layered.

As shown in FIG. 4, the aircraft wing 401 includes an outermost wing surface 402, a first fiber glass prepreg layer 403 underlying the outermost wing surface 402 and a first film adhesive 404, a first heater layer 405 that includes the CNT heater 103 (see FIG. 1) and underlies the first fiber glass prepreg layer 403 and a second film adhesive 406, a second heater layer 407 that includes one of the first or second PTC heaters 104 or 106 (see FIG. 1) and underlies the first heater layer 405 and a third film adhesive 408, a third heater layer 409 that includes the other of the first or second PTC heaters 104 or 106 (see FIG. 1) and underlies the second heater layer 407 and a fourth film adhesive 410 and a second fiber glass prepreg layer 411 underlying the third heater layer 409 and a fifth film adhesive 412.

Thus, in the embodiments of FIG. 4, the CNT heater 103 and the first and second PTC heaters 104 and 106 all occupy different layers in the aircraft wing 401.

Technical effects and benefits of the present disclosure are the provision of a combination of CNT and PTC heaters in a circuit architecture for regulating and controlling an effective resistance of the hybrid heater system, the usage of PTC heaters for self-regulating characteristics to limit maximum heating temperatures, the provision of PTC and CNT heaters in a circuit for quicker initial heating at the start, a design that allows for the elimination of a temperature control unit for heater protection, the usage of different PTC material characteristics in different layers to obtain certain heating characteristics at low and high temperature conditions and a layered heater stack with high thermal conductive adhesive for enhanced heat transfer to wing outside surfaces.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A hybrid heater system for aircraft wing ice protection, the hybrid heater system comprising:
   a voltage source;
   a carbon nano-tube (CNT) heater;
   a first positive temperature coefficient (PTC) heater disposed in parallel with the CNT heater to form a parallel formation;
   a second PTC heater disposed in series between the voltage source and the parallel formation; and
   an aircraft wing in which the CNT heater and the first and second PTC heaters are layered,
   wherein the CNT heater and the first PTC heater occupy a same layer in the aircraft wing.

2. The hybrid heater system according to claim 1, wherein:
   the second PTC heater establishes a maximum temperature capability for ice protection, and
   the hybrid heater system operates with an absence of active temperature controls.

3. The hybrid heater system according to claim 1, wherein the first and second PTC heaters have differing and tailored electrical resistivity.

4. The hybrid heater system according to claim 1, wherein an effective electrical resistance of the parallel formation is less than an electrical resistance of each of the CNT heater and the first PTC heater.

5. The hybrid heater system according to claim 1, wherein the same layer occupied by the CNT heater and the first PTC heater comprises:
   a first terminal;
   a second terminal;
   first PTC heater elements extending between the first and second terminals; and
   CNT heater elements interleaved between the first PTC heater elements and extending between the first and second terminals.

6. The hybrid heater system according to claim 1, wherein the aircraft wing comprises:
   an outermost wing surface;
   a first fiber glass prepreg layer underlying the outermost wing surface and a first film adhesive;
   a first heater layer underlying the first fiber glass prepreg layer and a second film adhesive, the first heater layer comprising CNT heater elements of the CNT heater and first PTC heater elements of the first PTC heater;
   a second heater layer underlying the first heater layer and a third film adhesive, the second heater layer comprising the second PTC heater; and
   a second fiber glass prepreg layer underlying the second heater layer and a fourth film adhesive.

7. A hybrid heater system for ice protection of an aircraft wing, the hybrid heater system comprising:
   a voltage source;
   a carbon nano-tube (CNT) heater comprising CNT heater elements;
   a first positive temperature coefficient (PTC) heater disposed in parallel with the CNT heater to form a parallel formation,
   the first PTC heater comprising first PTC heater elements interleaved with the CNT heater elements in a first aircraft wing layer; and
   a second PTC heater disposed in a second aircraft wing layer and in series between the voltage source and the parallel formation.

8. The hybrid heater system according to claim 7, wherein:
   the second PTC heater establishes a maximum temperature capability for ice protection, and
   the hybrid heater system operates with an absence of active temperature controls.

9. The hybrid heater system according to claim 7, wherein the first and second PTC heaters have differing tailorable electrical resistivity.

10. The hybrid heater system according to claim 7, wherein an effective electrical resistance of the parallel formation is less than an electrical resistance of each of the CNT heater and the first PTC heater.

11. The hybrid heater system according to claim 7, wherein the first aircraft wing layer comprises first and second terminals between which the interleaved CNT and first PTC heater elements extend.

12. The hybrid heater system according to claim 7, wherein the second aircraft wing layer underlies the first aircraft wing layer.

* * * * *